June 2, 1964  N. N. FENDER  3,135,133
MECHANISM CONTROL
Filed Dec. 15, 1961  2 Sheets-Sheet 2
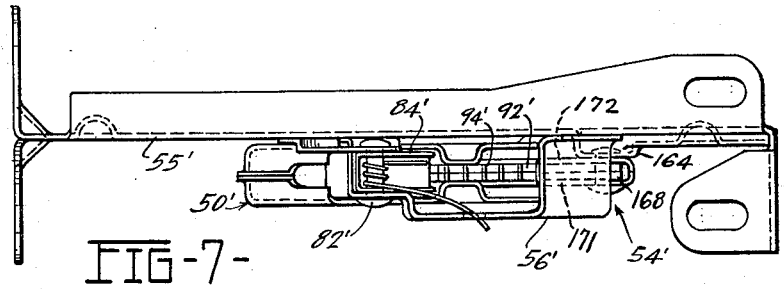
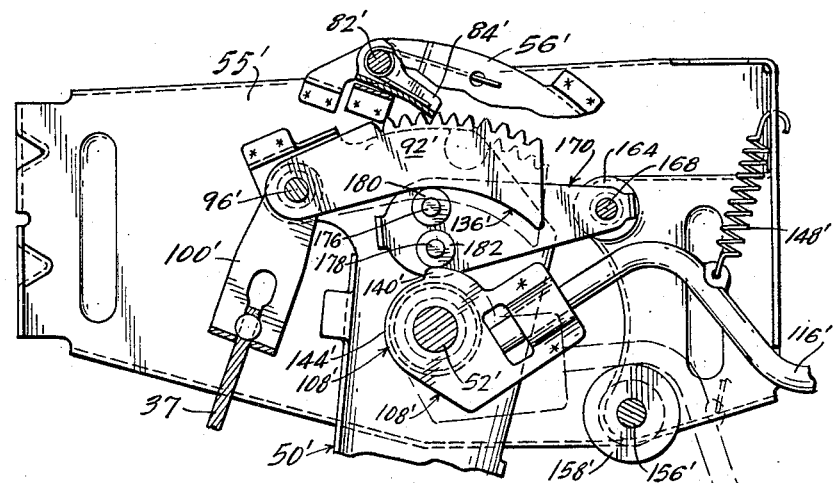
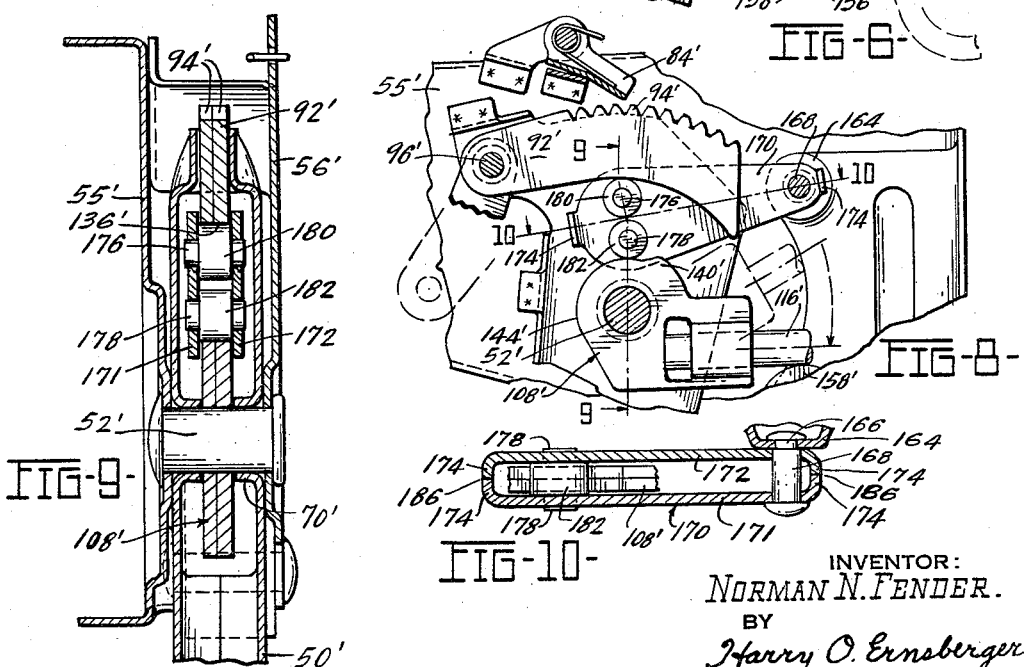
INVENTOR:
NORMAN N. FENDER.
BY
Harry O. Ernsberger
ATTORNEY United States Patent Office 3,135,133
Patented June 2, 1964

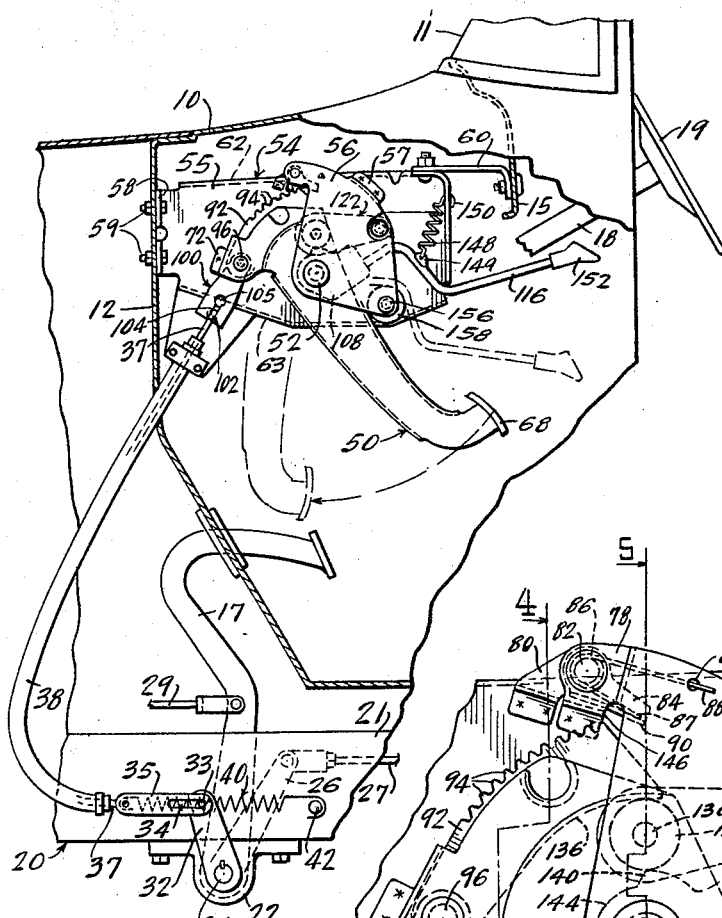

3,135,133
MECHANISM CONTROL
Norman N. Fender, Erie, Mich., assignor to Universal American Corporation, a corporation of Delaware
Filed Dec. 15, 1961, Ser. No. 159,703
9 Claims. (Cl. 74—541)

This invention relates to mechanism control and more especially to means and mechanism for actuating or controlling the parking or emergency brakes of a vehicle.

Various forms of manually-operated and foot-operated mechanisms or devices have been developed and utilized for actuating and controlling the parking brakes of automotive vehicles. With the trend in automotive vehicle developments toward lower vehicle body constructions and the utilization of the space between the dashboard or firewall and the instrument panel for instrumentation installations and the amount of force required to actuate parking brakes, foot actuated mechanism or pedal levers have come into extensive use for such purpose. Pawl and ratchet mechanism has been employed as a means for retaining the parking brakes in set position wherein a ratchet member pivotally carried by a support is normally engaged with a pawl for holding the brake actuating lever in brake setting positions, such arrangements embodying means for releasing the ratchet member for movement out of the path of the pawl member to effect release of the brakes.

In such devices that have been heretofore used or proposed, an abutment means is employed for normally holding the ratchet member in operative position, a manually controlled release being provided for the abutment. With the trend toward requiring increased force to set the brake mechanism, the thrust transmitted through the ratchet member to the abutment is greatly increased rendering it difficult to effect a release of the abutment to release the parking brakes.

The present invention embraces a foot-operated lever arrangement arranged to be connected with mechanism to be actuated embodying cooperating interengageable members for holding the lever arrangement in brake setting positions and embodying a means for releasing the lever retaining means which requires a minimum of effort upon the part of a vehicle operator.

Another object of the invention is the provision of a foot-operated lever arrangement for actuating and controlling parking or emergency brakes of a vehicle embodying a pawl and toothed sector lever retaining means in combination with antifriction means to facilitate disengagement of the pawl and toothed sector means with a minimum of effort.

Another object of the invention is the provision of a foot-operated lever arrangement for actuating and controlling the parking and emergency brakes of a vehicle wherein the arrangement includes cooperating interengageable members for retaining the lever arrangement in brake setting positions wherein one of the members is articulately or pivotally carried by the lever and is normally held in operative or effective position through roller means cooperating with cam means for controlling engagement and disengagement of the interengageable members.

Another object of the invention is the provision of a foot-operated lever arrangement for actuating and controlling the parking or emergency brakes of a vehicle embodying cooperating members for retaining the lever in brake set position and embodying a release means which may be manually operated or foot-operated.

Still another object of the invention is the provision of a foot-operated lever arrangement for actuating and controlling vehicle brake mechanism embodying a lever retaining means comprising a ratchet element and pawl means wherein the ratchet element may be released by anti-friction means whereby the element may be swung or moved out of the path of the pawl during movement of the foot-operated lever toward brake releasing position whereby the liability of damage to the teeth of the element or to the pawl is substantially eliminated.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an elevational view of a portion of an operator's compartment of a vehicle, with certain portions broken away, illustrating one form of mechanism control of the invention;

FIGURE 2 is an enlarged side elevational view of the mechanism control illustrated in FIGURE 1;

FIGURE 3 is a sectional view taken substantially on the line 3—3 of FIGURE 2;

FIGURE 4 is a transverse sectional view taken substantially on the line 4—4 of FIGURE 2;

FIGURE 5 is a transverse sectional view taken substantially on the line 5—5 of FIGURE 2;

FIGURE 6 is a side elevational view with certain parts illustrated in section of a modified form of the invention;

FIGURE 7 is a top plan view of the construction illustrated in FIGURE 6;

FIGURE 8 is a view similar to FIGURE 6 illustrating the lever retaining mechanism in lever release position;

FIGURE 9 is an enlarged transverse sectional view taken substantially on the line 9—9 of FIGURE 8, and FIGURE 10 is a detail sectional view taken substantially on the line 10—10 of FIGURE 8.

While the forms of mechanism control of the invention and the release arrangement therefor are particularly adapted for installation in automotive vehicles and utilized for actuating or controlling the emergency or parking brakes, it is to be understood that the invention may be utilized with other forms of actuating and controlling mechanism wherever the same may be found to have utility.

Referring to the drawings in detail, and initially with respect to the form of the invention illustrated in FIGURES 1 through 5, FIGURE 1 illustrates the installation of a form of the invention in the operator's compartment of a vehicle. With reference to FIGURE 1, there is illustrated a forward portion of a vehicle including a cowl 10, windshield 11, a dashboard or firewall 12, an instrument panel 15, a service brake pedal 17, a steering post 18 and a steering wheel 19.

The chassis frame 20 of the vehicle is inclusive of a pair of transversely spaced parallel side members, one of which is shown at 21, which are joined by cross braces or members (not shown). Secured to the frame members 21 are brackets 22, one of which is shown in FIGURE 1, which journally support a transverse shaft 24. Fixed upon the shaft 24 is an arm 26 adapted to be connected by a rod 27 or other means with the parking brakes which are associated with a pair of vehicle road wheels (not shown), the parking brakes being of conventional construction.

The service brake pedal 17 may be journaled upon the rod 24 and, through the medium of a rod 29, is adapted to actuate conventional hydraulic means for setting the service brakes of the vehicle. Secured on the shaft 24 is an arm 32 provided with a pin 33 which extends into a slot 34 formed in a link 35. The link 35 is connected to one end of a flexible cable 37 enclosed in a tubular sheath 38, the other end of the cable being connected to the parking brake actuating mechanism hereinafter described.

A contractile spring 40 is connected with the link 35, the spring being anchored to a pin 42 secured to a side frame member 21. The spring 40, in conjunction with the conventional brake return springs (not shown) serve to normally bias the link 35 in a right-hand direction as viewed in FIGURE 1 toward brake release position. As shown in FIGURES 1 through 4, the mechanism control of the invention includes a foot-operated lever or pedal 50 which is fulcrumed upon a pin or stub shaft 52 which is carried by a support 54.

In the embodiment illustrated, the support 54 includes a bracket or member 55 and a supplemental member or plate 56 which has tabs or ear portions 57 spot welded or otherwise fixed to the support bracket 55. The bracket 55 is provided at one end with a flange 58 secured by bolts 59 to the dashboard or firewall 12, the other end of the support bracket 55 being connected to the instrument panel by means of a clip or L-shaped member 60. The bracket 55 is formed with an upper flange 62 and a lower flange 63 to enhance rigidity of the support.

The lever construction 50 is preferably formed of sheet metal of two mating sections 65 and 66, the major portions of which are of channel shape in cross-section, the inwardly extending flange portions of the channel configuration being arranged in abutting relation and welded together at a juncture line 67, shown in FIGURES 3 and 4. Secured to the lower ends of the mating sections 65 and 66 is a metal foot pad 68 which may, if desired, be faced or covered with a pad of rubber or other nonmetallic material.

The upper region of the lever 50 extends between the support bracket 55 and the support plate 56. The regions of the side walls of the lever are shaped inwardly to form hub portions 70 which are journaled or fulcrumed upon the pin or stub shaft 52. The upper extremities of the lever sections are formed with pad portions 72 which are spot welded together, as shown in FIGURE 2, to lend rigidity to the upper portion of the lever 50. The inwardly extending hub portions 74 provide a substantial bearing area with the fulcrum pin or stub shaft 52.

The stub shaft 52 extends through registering openings in the bracket 55 and the plate 56 whereby the lever is fulcrumed on the support structure through the pin 52. The end of the rivet or shaft 52 is swaged as at 75 to maintain the lever in proper position between the support members 55 and 56. The support plate 56 is provided with an ear portion 78 and welded to the frame 55 is a bracket or member 80. The ear 78 and member 80 are provided with openings to accommodate a pin or rivet 82 upon which is pivotally supported a pawl member 84.

The pawl or pawl member is preferably formed of sheet metal of channel-shaped cross-section, the legs of the channel having registering openings to receive the pin or rivet 82. After assembly of the rivet 82 and pawl 84 to the members 78 and 80, the end of the rivet 82 may be swaged over as shown at 85 in FIGURE 3. A coil spring 86 surrounds the rivet 82, one end 87 of the spring engaging the bight portion of the pawl, the other end 88 being anchored through an opening 89 in the plate 56, as shown in FIGURE 2. The spring is tensioned to bias the pawl 84 in a clockwise direction, as viewed in FIGURE 2, the pawl being formed with a tooth portion 90.

The tooth 90 of the pawl 84 is adapted for cooperation with the teeth of a toothed member, sector or ratchet construction 92 for retaining the lever 50 in adjusted or brake setting positions. The toothed sector or ratchet construction, in the embodiment illustrated comprises a pair of identically shaped members 93 formed with ratchet teeth 94, the ratchet construction 92 being adapted to be pivotally or articulately connected with the lever construction 50. As shown in FIGURE 2, the lever construction is provided with openings to receive a pin or rivet 96.

The rivet 96 extends through aligned openings in the leg portions 98 of a clevis member 100.

The cable 37, for connecting the lever construction 50 with the emergency or parking brakes of the vehicle, is provided at its upper extremity with a ball or abutment 102 which normally engages the bight portion of the clevis 100 to establish operative connection between the clevis and the cable. As shown in FIGURE 2, one of the leg portions 98 of the clevis is formed with a slot 104 and an enlarged generally circular opening 105 in communication with the slot 104, the opening 105 being of a dimension to receive the abutment or ball 102, and the slot 104 of a width to accommodate the cable 37.

In assembling these components, the abutment 102 is inserted through the opening 105 and the adjacent portion of the cable 37 received through the slot 104, after which the cable 37 is moved in a direction away from the clevis until the abutment 102 engages the bight portion of the clevis.

The members 93 forming the ratchet construction 92 are provided with registering openings and the rivet 96 extends through these openings to establish a pivotal or articulate connection of the ratchet 92 with the lever 50. The ratchet construction 92 is thereby arranged to be moved with the lever 50 but, through its pivotal support 96, may be swung toward or away from the pawl 90.

It is to be understood that while the components or sections 94 forming the ratchet construction 92 are fashioned in this manner to enable their fabrication by blanking each component 94 from sheet metal, the ratchet 92 may be formed of a single element equal to substantially twice the thickness of one of the sections 94.

The arrangement of the invention includes means for normally maintaining the ratchet construction 92 in a position wherein the teeth 94 thereof move in a path for cooperative engagement with the tooth portion 90 of the pawl 84. The interengagement of the tooth 90 of the pawl member 84 with the teeth 94 of the ratchet member 92 is effective to hold the lever 50 and the emergency or parking brake construction in brake setting positions. Journally supported upon the fulcrum pin 52 is a cam means or abutment construction 108 comprising matching sections 110 which are spot welded together at the regions indicated at 112 in FIGURE 2.

The sections 112 are shaped to provide a cylindrically-shaped recess to accommodate an end region 114 of a relatively movable control element or rod 116 for moving the cam or abutment means 108. The support bracket 55 and plate 56 are formed respectively with inwardly extending bosses or raised portions 117 and 118, the raised portions being provided with openings accommodating a stub shaft or rivet 120.

The rivet 120 forms a pivotal anchor for a member or arm construction 122, which may be formed as two parallel sections or portions 124 or may be independent sections joined together as an integral U-shaped member by means of a bridge section or connection 126 shown in FIGURES 2 and 3. In this manner the arm construction 122 is anchored for pivotal movement about the axis of the rivet 120. The distal end regions of the parallel sections 124 of the arm or arm construction 122 are provided with aligned openings to accommodate a stub shaft 130 upon which is journally supported roller means or a roller 132.

The roller means 132 is disposed between the sections 124 of the arm construction 122 as shown in FIGURE 5. The edge region of the ratchet construction 92 opposite the teeth 94 is formed with a curved surface 136 of a curvature generated about the axis of the fulcrum pin 52. The abutment or cam means 108 is fashioned with a raised abutment, lobe or land 140 which, when the cam 108 is in the position shown in FIGURE 2, engages the roller means 132 to hold the latter in its uppermost position, as viewed in FIGURE 2, in which position the roller engages the curved surface 136 of the ratchet 92 to hold the latter in a position where the teeth 93 thereof move in a path for engagement with the pawl 90.

With these components in this position, pressure applied upon the foot pad 68 of the lever 50 swings the lever about its fulcrum 52 carrying with it the ratchet 92 and effecting longitudinal movement of the cable 37 to set the parking brakes. The pawl tooth 90 engages an adjacent tooth of the series of ratchet teeth 94 to maintain the brakes in set position. When it is desired to release the ratchet 92 for movement downwardly or to a position out of the path of the pawl tooth 90 the control member 116 is moved downwardly as viewed in FIGURE 2.

This movement of the control means 116 effects rotation of the cam or abutment means 108 whereby the land 140 is moved out of supporting position with the roller means 132 permitting the roller means 132 to move downwardly, with the roller engaging a curved region 144 of the abutment means 108 of lesser distance from the fulcrum 52 than the land or cam lobe 140. As the roller means 132 moves downwardly out of engagement with the land or lobe 140, the ratchet construction 92 moves downwardly about the pivotal axis of the rivet 96 thus disengaging the ratchet teeth 94 from the pawl 90 permitting return of the lever 50 to its brake release position, shown in FIGURES 1 and 2.

A ledge 146 on the frame plate 56 is engaged by the bight portion of the pawl 84 to limit the downward movement of the pawl tooth portion 90 to assure disengagement of the ratchet teeth 94 from the pawl tooth when the cam 108 is moved to ratchet-releasing position.

The cam 108 is maintained in operative or ratchet supporting position under the influence of a contractile coil spring 148, one end of the spring being anchored to the control member 116 as at 149 and the other end 150 of the spring being hooked through an opening in a flange portion of the bracket 55.

As shown in FIGURE 1, the control means or rod 116 is provided at its distal end with a pad or handle portion 152 providing a means for actuating the control rod 116. The portion 152, illustrated in FIGURE 1, provides a grip portion for moving cam 108 to ratchet releasing position, but it is to be understood that the control rod 116 may be shaped to extend downwardly and the portion 152 fashioned as a pad for foot operation.

The support bracket 55 and the support plate 56 are provided with aligned openings to accommodate a rivet or pin 156 shown in FIGURES 1 and 2 which provides a mounting for a circular disc-like member 158 formed of nonmetallic material such as semi-hard rubber which serves as a resilient abutment with which the lever 50 is engaged when the latter is released for movement to brake release position.

The operation of the arrangement shown in FIGURES 1 through 5 is as follows: The lever construction 50 and the components associated therewith are shown in brake release position in FIGURES 1 and 2. In this position, the cam lobe 140 engages and supports the roller means 132, the roller means engaging and supporting or maintaining the ratchet construction 92 in a position whereby the pawl tooth 90 of pawl 84 may interengage the ratchet teeth 94.

When the operator desires to set the parking brakes, foot pressure is exerted upon the pad 68 carried by the lever 50, thereby swinging the lever 50 about the axis of the fulcrum pin or shaft 52 in a clockwise direction as viewed in FIGURES 1 and 2.

This action applies an upward force upon the brake actuating cable 37 through the clevis 100 and the pin 96 to effect a setting of the parking brakes. During this movement of the lever 50, the ratchet teeth 94 move in a path to be engaged by the pawl tooth 90, the latter engaging one of the ratchet teeth in a brake setting position, preventing retraction of the brake lever. The spring 148 maintains the cam means 108 in a position whereby the cam lobe 140 supports the roller means 132 and the ratchet construction 92 in operative position.

When it is desired to release the emergency or parking brakes, the operator actuates the control rod 116, swinging the latter in a clockwise direction as viewed in FIGURES 1 and 2 against the tension of the spring 148. This movement of the rod 116 rotates the cam means 108 about the pin or shaft 52 whereby the lobe 140 moves away from engagement with the roller means 132. When this occurs the roller means 132 and its stabilizing arm 122 swing downwardly about the axis of the shaft or rivet 120 to engage the roller means 132 with a curved surface 144 of lesser radial dimension than the cam lobe 140.

As the roller means 132 moves downwardly, the ratchet construction 92 swings in a clockwise direction about the axis of the pin 96 to thereby disengage a tooth of the ratchet teeth 94 from the pawl tooth 90, releasing the lever construction 50 for movement toward brake release position under the influence of the brake springs and spring 40 to retract the brake cable 37 and release the brakes.

The ledge portion 146 of the bracket 56 forms an abutment engageable with the lower surface of the bight portion of the channel shaped pawl 84 to limit the downward movement of the pawl tooth 90 so that the latter is held out of the path of the ratchet teeth 93 when the latter is moved away from the pawl tooth through the release movement of the cam construction 108 in the manner above mentioned.

After the brake lever 50 is returned to brake release position, illustrated in full lines in FIGURE 1, the operator releases the control rod 116 and, under the influence of the contractile spring 148, the cam means 108 is returned to a position wherein the lobe 140 elevates the roller means 132 which, in turn, elevates the ratchet construction 92 to a position wherein the ratchet teeth 93 are again disposed in a path for engagement with the pawl tooth 90 upon a succeeding movement of the lever 50 toward brake setting position.

FIGURES 6 through 10 illustrate a modification of the roller means providing an effective support or strut between the cam and the ratchet construction to further minimize friction in effecting release of the ratchet member or means from a pawl means so as to reduce to a minimum the effort required to effect a release of the mechanism.

The arrangement shown in FIGURES 6 through 10 is generally similar to that shown in FIGURES 1 through 5 and is inclusive of a support construction 54' comprising a support bracket 55' and a support plate 56', these members being provided with openings to accommodate the fulcrum shaft or pin 52' upon which the lever 50' is pivotally supported or fulcrumed. The pin 96' connects the lever 50' with a clevis 100' which, in turn, is connected with the brake actuating cable 37 in the manner hereinbefore described. Journaled upon the fulcrum pin 52' is a cam construction 108' having a cam lobe 140'.

Pivotally mounted by the pin 96' and carried by the lever is the ratchet construction 92'. A pawl 84', of the same construction as pawl 84, is pivotally supported by a rivet 82' journaled by means associated with the support bracket 55' and the plate 56' as shown in FIGURE 7. A control rod 116' is connected with the cam construction 108' and a contractile spring 148' urges or biases the control rod 116' and the cam construction 108' to the position shown in FIGURE 6. The support bracket 55' is provided with an embossment or raised portion 164 provided with an opening to receive a tenon portion 166 of a pin or rivet 168 shown in FIGURE 10.

Pivotally mounted upon the rivet 168 is an arm or arm construction 170 preferably fashioned of two matched sections or components 171 and 172 formed of sheet metal having inwardly extending flanges 174 at their end regions.

The sections 171 and 172 are fashioned with two sets of aligned openings to accommodate tenons 176 and 178 of roller means or rollers 180 and 182 disposed between the parallel sections 171 and 172 as particularly shown in FIGURES 9 and 10. The rollers are mounted in spaced relation providing a space 184 between the rollers so that the rollers may rotate independently of each other.

After the rollers 180 and 182 are assembled between the sections 171 and 172, the pairs of flanges 174, in abutting relation as shown in FIGURE 10, are welded along the juncture lines 186 so that the rollers or roller means are maintained in proper relation. As particularly shown in FIGURES 6 and 7, the upper roller means or roller 180 engages the curved lower surface region 136' of the ratchet construction 92' and the roller means or roller 182 is in engagement with the lobe 140' of the cam construction 108 as shown in FIGURE 6.

The roller 182 engages the surface 144' of lesser radius, as shown in FIGURE 8, when the cam 108' is in ratchet-releasing position. It will be apparent in FIGURES 6, 7 and 8, that the roller means 180 and 182 are not in peripheral engagement so that the roller 180 is always in rolling engagement with the curved surface 136' of the ratchet construction 92' and the roller 182 is always in rolling engagement with the contour of the cam construction 108' comprising the lobe 140' and the curved surface 144'.

The pin 156' carried by the support bracket 55' supports a cushion or buffer element 158' of nonmetallic material such as semi-hard rubber to cushion the impact of the return movement of the lever to brake release position.

The arrangement shown in FIGURES 6 through 10 functions in substantially the same manner as the arrangement shown in FIGURES 1 through 5. However, the effort required to release the ratchet construction 92 from engagement with the pawl 84' is reduced to a minimum through the engagement of the roller 180 with the ratchet construction 92' being entirely independent of the engagement of the roller 182 with the cam lobe 140' of the cam 108'. FIGURE 6 illustrates the lever 50' and the ratchet construction 92' maintained in position with the ratchet teeth 94' in a position whereby the pawl 84' engages one of the ratchet teeth 93' thus holding the parking brakes in brake set position.

In order to release the engagement of the ratchet 92' with the pawl 84', the operator moves the control rod 116' to rotate the cam means 108' in a direction to move the lobe 140' away from engagement with the roller means 182. This requires a minimum of effort by reason of the rolling engagement of roller means 182 with the cam contour of the cam means 108'.

When the cam means 108' is moved to the position shown in FIGURE 8, the arm 170 is swung downwardly and the roller means 180 moved downwardly to permit the ratchet member 92' to pivot around the pin 96' to a position where the teeth 94' are disengaged from the pawl 84' thus permitting the lever construction 50 to swing, in a counterclockwise direction, about its fulcrum or pivot shaft 52' to release the parking brakes.

As soon as the operator withdraws pressure from the control rod 116', the cam construction 108' is rotated in a counterclockwise direction to elevate the arm 170 by engagement of the cam lobe 140' with the roller 182 and the ratchet construction 92' moved upwardly to a position to be engaged by the pawl 84'. In such position, the interengaging pawl and ratchet members are adapted to hold the brakes in set position upon a succeeding movement of the lever 50' in brake setting direction.

It is apparent that, within the scope of the invention, modifications and different arrangements may be made other than as herein disclosed, and the present disclosure is illustrative merely, the invention comprehending all variations thereof.

I claim:

1. Mechanism for controlling brakes of a vehicle including, in combination, a support, a lever fulcrumed on the support and adapted to be connected with the vehicle brakes, means for retaining the lever in brake setting positions including pawl and ratchet members arranged for interengagement and disengagement, one of said members being pivotally connected with the support and the other of said members being pivotally connected with the lever, a cam mounted by the support for rotation, roller means disposed between the cam and the ratchet member, said cam and roller means being normally arranged to position the ratchet member to be engaged by the pawl member, a control member connected with the cam, said control member being movable to rotate the cam to a position to release the ratchet member from engagement with the pawl member to release the lever from brake setting position.

2. Mechanism for controlling brakes of a vehicle including, in combination, a support, a lever fulcrumed on the support and adapted to be connected with the vehicle brakes, means for retaining the lever in brake setting positions including pawl and ratchet members arranged for interengagement and disengagement, one of said members being pivotally connected with the support and the other of said members being pivotally connected with the lever, a cam journaled for rotation about the axis of the fulcrum of the lever, roller means disposed between the cam and the ratchet member, said cam and roller means being normally arranged to position the ratchet member to be engaged by the pawl member, said cam and roller means being movable relative to said ratchet member whereby the ratchet member may be moved out of engagement with the pawl member to release the lever from brake setting position, control means connected with the cam for effecting rotation of the cam to release the lever, and resilient means normally biasing the ratchet member into engagement with the pawl member.

3. Mechanism for controlling brakes of a vehicle including, in combination, a support, a lever fulcrumed on the support and adapted to be connected with the vehicle brakes, means for retaining the lever in brake setting positions including pawl and ratchet members arranged for interengagement and disengagement, one of said members being pivotally connected with the support and the other of said members being pivotally connected with the lever, a cam journaled for rotation about the fulcrum of the lever, roller means arranged for engagement with the cam and with the ratchet member normally positioning the ratchet member in engagement with the pawl member, and control means connected with the cam for effecting rotation of the cam and relative movement of the roller means whereby the ratchet member is movable out of engagement with the pawl member.

4. Mechanism for controlling brakes of a vehicle including, in combination, a support, a lever fulcrumed on the support, pivot means carried by the lever, a clevis connected to the lever by the pivot means, means for retaining the lever in brake setting positions including interengageable pawl and ratchet members, said ratchet member being connected with the lever by said pivot means, said pawl member being pivotally mounted on the support, a cam journaled for rotation about the axis of the fulcrum of the lever, an arm movably mounted by the support, roller means journally supported on the arm interposed between the cam and the ratchet means and arranged to normally maintain the ratchet member in a position for operative engagement with the pawl member, and control means connected with the cam for rotating the cam to effect relative movement of said roller means whereby the ratchet member is movable to a position out of engagement with the pawl member to release the lever from brake setting position.

5. Mechanism for controlling parking brakes of a vehicle including, in combination, a support, a lever fulcrumed on the support and adapted to be connected with the vehicle brakes, means for retaining the lever in brake setting positions including interengageable pawl and ratchet members, said ratchet member being articulately supported by the lever and said pawl member pivotally mounted by the support, relatively movable roller means engageable with the ratchet member adapted in one position to maintain the teeth of the ratchet member in a region for operative engagement with the pawl member, resilient means effective to normally bias the relatively movable roller means to said one position, a cam rotatably mounted by the support engageable with the roller means and a control element connected with the cam for actuating the relatively movable roller means to a position whereby the ratchet member is movable out of engagement with the pawl member.

6. Mechanism for controlling brakes of a vehicle including, in combination, a support, a lever fulcrumed on the support and adapted to be connected with the vehicle brakes, means for retaining the lever in brake setting positions including pawl and ratchet members arranged for interengagement and disengagement, one of said members being pivotally connected with the support and the other of said members being pivotally connected with the lever, a cam journaled for rotation about the axis of the fulcrum of the lever, a movably mounted arm, a pair of rollers rotatably mounted on the arm, one of said rollers being in engagement with a surface of the ratchet member and the other of said rollers being in engagement with the cam, and a manually operable control means connected with the cam for rotating the cam to effect swinging movement of the arm and swinging movement of the ratchet member out of engagement with the pawl member.

7. Mechanism for controlling brakes of a vehicle including, in combination, a support, a lever fulcrumed on the support and adapted to be connected with the vehicle brakes, means for retaining the lever in brake setting positions including pawl and ratchet members arranged for interengagement and disengagement, a pin carried by the lever member, said ratchet member being pivotally mounted by said pin, cam means journally supported for movement about the fulcrum axis of the lever, an arm pivotally connected with the support, roller means supported on said arm arranged for engagement with a surface of the ratchet member, said cam means and roller means being normally positioned to maintain the teeth of the ratchet member in cooperative relation with the pawl member, resilient means normally biasing the ratchet member to a position maintaining the teeth of the ratchet member in cooperative relation with the pawl member, and a control element cooperatively associated with the cam means and adapted to actuate the cam means to a position whereby the ratchet member is movable out of engagement with the pawl member.

8. Mechanism for controlling brakes of a vehicle including, in combination, a support, a lever fulcrumed on the support, means for retaining the lever in brake setting positions including pawl and ratchet members arranged for interengagement and disengagement, a pin carried by the lever member, a clevis connected to the lever by the pin and arranged to be connected with the vehicle brakes, said ratchet member being pivotally mounted by said pin, cam means journally supported for movement about the fulcrum axis of the lever, an arm pivotally connected with the support, a pair of rollers in spaced relation journally supported on said arm, one of said rollers being in engagement with a surface of the ratchet member and the other of said rollers being in engagement with the cam means, said cam means and rollers being normally positioned to maintain the teeth of the ratchet member in cooperative relation with the pawl member, resilient means normally biasing the ratchet member to a position maintaining the teeth of the ratchet member in cooperative relation with the pawl member, and a control element cooperatively associated with the cam means and adapted to actuate the cam means to a position whereby the ratchet member is movable out of engagement with the pawl member.

9. Mechanism for controlling parking brakes of a vehicle including, in combination, support means, a lever fulcrumed on the support means and adapted to be connected with the vehicle parking brakes, means for retaining the lever in brake setting positions including a pair of members arranged for engagement and disengagement, one of said members being pivotally mounted on the support means and the other of said members being pivotally mounted on the lever, a cam mounted by the support means for rotation, roller means disposed between the cam and the member pivotally mounted on the lever, said roller means being arranged for movement relative to said cam and the member pivotally mounted on the lever, said cam and roller means being normally arranged to position the member pivotally mounted on the lever to be engaged with the member pivotally mounted on the support means, and a control member connected with the cam adapted to rotate the cam to a position whereby through the roller means the member pivotally mounted on the lever may be moved out of engagement with the member pivotally mounted on the support means to release the lever from brake setting position.

References Cited in the file of this patent

UNITED STATES PATENTS

| | | |
|---|---|---|
| 1,842,796 | Morgan | Jan. 26, 1932 |
| 2,937,540 | Claus | May 24, 1960 |
| 2,973,665 | Mellen et al. | Mar. 7, 1961 |